US012683392B2

(12) United States Patent
Galin et al.

(10) Patent No.: US 12,683,392 B2
(45) Date of Patent: Jul. 14, 2026

(54) DC BUS MANAGEMENT

(71) Applicant: Solaredge Technologies Ltd., Herzeliya (IL)

(72) Inventors: Yoav Galin, Raanana (IL); Amir Peri, Kochav Yair (IL); Ilan Yoscovich, Givatayim (IL)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

(21) Appl. No.: 18/922,868

(22) Filed: Oct. 22, 2024

(65) Prior Publication Data

US 2025/0132561 A1      Apr. 24, 2025

Related U.S. Application Data

(60) Provisional application No. 63/592,340, filed on Oct. 23, 2023.

(51) Int. Cl.
    *H02J 1/14*          (2026.01)
    *H02J 1/102*        (2026.01)
              (Continued)

(52) U.S. Cl.
    CPC .............. *H02J 1/14* (2013.01); *H02J 1/102* (2013.01); *H02J 7/855* (2026.01); *H02J 7/865* (2026.01);
              (Continued)

(58) Field of Classification Search
    CPC .. H02J 1/14; H02J 1/102; H02J 7/0063; H02J 7/0068; H02J 7/00712; H02J 13/00002;
              (Continued)

(56) References Cited

U.S. PATENT DOCUMENTS 5,929,538  A      7/1999  O'Sullivan et al.
9,172,249  B2    10/2015  Rockenfeller et al.
              (Continued)

OTHER PUBLICATIONS

E.C.W. de Jong & P.T.M. Vaessen, "DC power distribution for server farms," Briefing Paper, Leonardo Energy, Kema Consulting, Sep. 2007.

(Continued)

*Primary Examiner* — Lincoln D Donovan
*Assistant Examiner* — Alex W Lam
(74) *Attorney, Agent, or Firm* — Banner & Witcoff, Ltd.

(57)          ABSTRACT

Systems, apparatuses, and methods are described for direct current (DC) bus management. In some examples, an energy storage device may be controlled to balance the voltage of the DC bus to maintain a substantially constant voltage on the DC bus. In some examples, control circuitry may determine the total power produced and the total power consumed of the power system and control the energy storage device to balance the power. The energy storage device may balance the power while maintaining a substantially constant voltage on the DC bus. In some examples, a DC to alternating current (AC) converter may be connected between the DC bus and an AC bus, and/or an AC to DC converter may be connected between the AC bus and the DC bus. The DC to AC converter and the AC to DC converter may have different power ratings.

20 Claims, 11 Drawing Sheets

(51) Int. Cl.

| | |
|---|---|
| *H02J 7/00* | (2026.01) |
| *H02J 7/90* | (2026.01) |
| *H02J 13/12* | (2026.01) |

(52) U.S. Cl.
CPC .............. *H02J 7/933* (2026.01); *H02J 13/12* (2026.01); *H02J 2207/20* (2020.01); *H02J 2207/30* (2020.01)

(58) Field of Classification Search
CPC ............... H02J 2207/20; H02J 2207/30; H02J 2300/24; H02J 2300/28; H02J 3/32; H02J 3/381; H02J 7/34; H02J 1/106
See application file for complete search history.

(56) References Cited

U.S. PATENT DOCUMENTS

| | | | |
|---|---|---|---|
| 9,214,815 B2 | 12/2015 | Okui | |
| 10,635,058 B2 | 4/2020 | Sanders et al. | |
| 11,025,056 B2 | 6/2021 | Kikuchi et al. | |
| 2009/0195074 A1 | 8/2009 | Buiel | |
| 2010/0181837 A1 | 7/2010 | Seeker et al. | |
| 2013/0000342 A1 | 1/2013 | Blasko et al. | |
| 2016/0236586 A1* | 8/2016 | Soo | B60L 1/006 |
| 2017/0194791 A1* | 7/2017 | Budde | H02J 9/061 |
| 2019/0372380 A1* | 12/2019 | Shen | H02J 1/14 |
| 2020/0280183 A1 | 9/2020 | Yamashita et al. | |
| 2023/0211646 A1* | 7/2023 | She | H02J 1/082 165/202 |
| 2023/0387693 A1* | 11/2023 | Xu | H02J 3/381 |

OTHER PUBLICATIONS

A. Scharer, "DC for efficiency," ABB Low Voltage Systems, pp. 16-21, Jan. 2014.
Mar. 6, 2025—European Search Report—EP App. No. 24208116.4.

* cited by examiner

600

DC BUS MANAGEMENT

CROSS-REFERENCE TO RELATED APPLICATIONS

This application claims the benefit of U.S. Provisional Application No. 63/592,340, filed on Oct. 23, 2023. The above referenced application is hereby incorporated by reference in its entirety.

BACKGROUND

In an electric power system, a direct current (DC) bus may be used to connect and distribute power between different devices of the power system. The DC bus may include busbars. The busbars together with electrical wires may be used to connect the different devices of the power system to each other. The busbars and electrical wires may be made from electrically conductive material, such as metal. The busbars and electrical wires may be covered with insulating material. The different devices of the power system may include power sources that provide power to the DC bus, or loads that take power from the DC bus.

SUMMARY

The following summary presents a simplified summary of certain features. The summary is not an extensive overview and is not intended to identify key or critical elements.

Systems, apparatuses, and methods are described for DC bus management. The systems, apparatuses, and methods may be used for management of a DC power system connected to the DC bus. In some examples, an energy storage device may be controlled to balance the voltage of the DC bus to maintain a substantially constant voltage on the DC bus. In some examples, control circuitry may determine the total power produced, the total power consumed of the power system, or control the energy storage device to balance the power. The energy storage device may balance the power while maintaining a substantially constant voltage on the DC bus. In some examples, a DC to alternating current (AC) converter may be connected between the DC bus and an AC bus, and/or an AC to DC converter may be connected between the AC bus and the DC bus. The DC to AC converter and the AC to DC converter may have different power ratings.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1A:
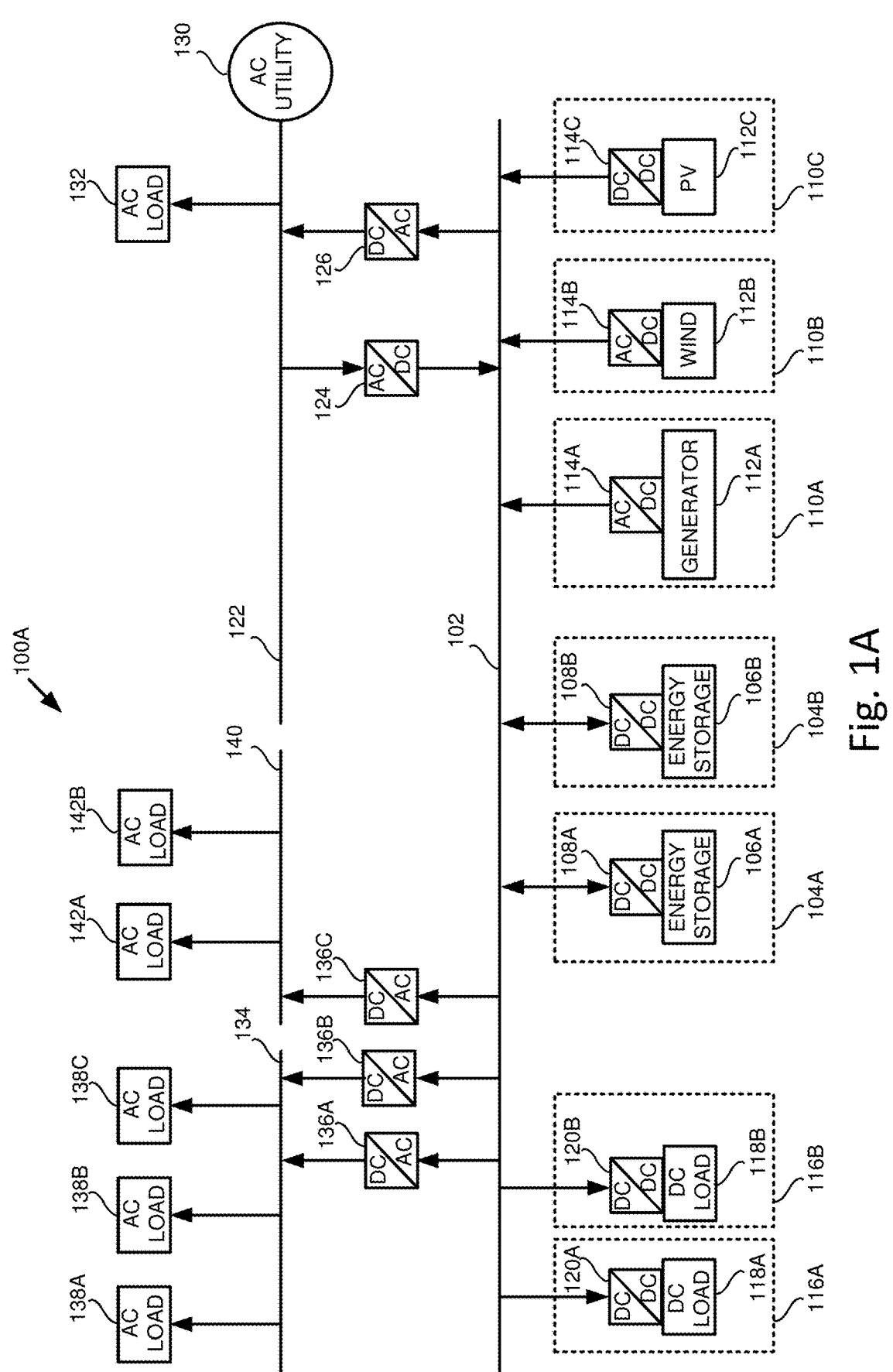
FIG. 1A shows an example power system.

The accompanying drawings, which form a part hereof, show examples of the disclosure. It is to be understood that the examples shown in the drawings and/or discussed herein are non-exclusive and that there are other examples of how the disclosure may be practiced.

Systems, apparatuses, and methods are described for DC bus management. The systems, apparatuses, and methods may be used for management of a DC power system connected to the DC bus. In some examples, an energy storage device may be controlled to balance the voltage of the DC bus to maintain a substantially constant voltage on the DC bus. In some examples, control circuitry may determine the total power produced and the total power consumed of the power system and control the energy storage device to balance the power. The energy storage device may balance the power while maintaining a substantially constant voltage on the DC bus. In some examples, a DC to AC converter may be connected between the DC bus and an AC bus, and/or an AC to DC converter may be connected between the AC bus and the DC bus. The DC to AC converter and the AC to DC converter may have different power ratings.

It is noted that the teachings of the presently disclosed subject matter are not bound by the systems and apparatuses described with reference to the figures. Equivalent and/or modified functionality may be consolidated or divided in another manner and may be implemented in any appropriate combination. For example, elements which are shown as separate units, may have their functionalities and/or components combined into a single unit.

It is also noted that like references in the various figures may refer to like elements throughout the application. Similar reference numbers may also connote similarities between elements. Throughout the application certain general references may be used to refer to any of the specific related elements. For example, energy storage device 104 refers to energy storage device 104A and/or energy storage device 104B, energy storage circuitry 106 refers to energy storage circuitry 106A and/or energy storage circuitry 106B, etc. It is also noted that all numerical values given in the examples of the description are provided for purposes of example only and do not exclude the use of other numerical values for the same feature.

The terms "substantially" and "about" are used herein to indicate variations that are equivalent for an intended purpose or function (e.g., within a permissible variation range). Certain values or ranges of values are presented herein with numerical values being preceded by the terms "substantially" and "about". The terms "substantially" and "about" are used herein to provide literal support for the exact number that it precedes, as well as a number that is near to or approximately the number that the term precedes. In determining whether a number is near to or approximately a specifically recited number, the near or approximating un-recited number may be a number, which, in the context in which it is presented, provides a substantial equivalent of the specifically recited number.

Control devices, including "controller," "control circuitry," "computer," "processor," "processing circuitry," and variations of these terms as used herein, include any analog or digital electronic hardware circuit capable of performing one or more logical or arithmetic functions. The functions may be based on a received signal (e.g., from a sensor that measures a physical parameter as in the various examples described herein). Performance of the functions may cause an output of a signal (e.g., to control another device such as a switch or to provide an indication as in the various examples described herein). Such control devices include, by way of non-limiting examples, a digital signal processor (DSP), microprocessor, microcontroller, field programmable gate array (FPGA), application-specific integrated circuit (ASIC), embedded controller, analog comparator, analog-to-digital controller, digital-to-analog controller, etc., or combinations thereof. Such control devices may include or be connected to a memory that stores instructions that may be read, interpreted and executed by the devices, and based on the executed instructions, perform any one of functions or control as described herein. The terms "memory" or "data storage device" used herein include any volatile or non-volatile computer memory suitable to the presently disclosed subject matter (e.g., random-access memory (RAM), static random-access memory (SRAM), read-only memory (ROM), erasable programmable read-only memory (EPROM), electrically erasable programmable read-only memory (EEPROM), dynamic random-access memory (DRAM), etc.). The above may include any of the control circuitry disclosed herein. More specifically, by way of non-limiting example, the above may include the control circuitry 210 or 310 disclosed in the present application. Control devices may be included or connected to interface hardware, that converts signals from other devices (e.g., sensors) to signals compatible with the control device (e.g., a comparator or analog to digital (A/D) converter that converts an analog signal to a digital signal), or that converts signals from the control device to signals compatible with another device (e.g., an amplifier for driving a control input of a switch). The control circuitry may be configured to output control signals to control an operational state (e.g., ON, OFF, opened, closed, etc.) of one or more switches.

Reference is now made to FIG. 1A, which shows an example power system 100A. Power system 100A may include: a DC bus 102, energy storage devices 104A-B, power sources 110A-C, and DC loads 116A-B. Power system 100 may also include: AC buses 122, 134, 140, power converters 124, 126, 136A-C, AC load 132, 138A-C, 142A-B, and AC power source 130 (also referred to herein as AC grid 130). Power converters of the power system 100 may also be referred to as converter circuitry, and vice versa.

DC bus 102 may be configured to distribute power for a location. For example, DC bus 102 may be configured to distribute power for a home, office building, sports arena, university campus, etc. DC bus 102 may include a plurality of DC bus lines. DC bus 102 may include a positive DC bus line 202A and a negative DC bus line 202B (shown in FIGS. 2 and 3). Connection to the DC bus 102 may be made by connecting to a terminal of the positive DC bus line 202A (also referred to as a positive terminal T+) and/or connecting to a terminal of the negative DC bus line 202B (also referred to as a negative terminal T–).

Energy storage devices 104 may be bi-directional energy storage devices configured to provide power to or receive power from DC bus 102. Energy storage devices 104A-B may include energy storage circuitry 106A-B (e.g., battery, capacitors, etc.). Energy storage circuitry 106 may be configured to supply power to DC bus 102 or receive power from DC bus 102. Energy storage devices 104A-B may also include converter circuitry 108A-B (e.g., DC to DC converter circuitry) and control circuitry (e.g., control circuitry 210 shown in FIG. 2). Energy storage devices 104 may be part of an electric vehicle (EV).

Power converter circuitry 108A-B may include, for example, one or more: buck converter circuitry, boost converter circuitry, buck/boost converter circuitry, buck+boost converter circuitry, flyback converter circuitry, etc. Power converter circuitry 108A-B may include direct current (DC)

to DC power converters. Power converter circuitry 108A-B may be configured to convert an input power to an output power.

Each energy storage device 104 may include one or more terminals connected to the DC bus 102. The one or more terminals of the energy storage device 104 may be switchably connected (e.g., connected via a relay, switch, transistor, etc., configured to electrically connect and disconnect the one or more terminals to and from the power bus) to the DC bus 102.

Power sources 110A-C may include power generation circuitry 112 (e.g., circuitry to generate power, for example, generator 112A, wind 112B, PV 112C, etc.). The power generation circuitry 112 may be configured to supply power to DC bus 102. Power sources 110A-C may also include converter circuitry 114A-C (e.g., DC to DC converter circuitry) and control circuitry.

Power generation circuitry 112 may include one or more PV modules, e.g. a plurality of PV modules connected in series as a serial string of PV modules. Each PV module may include a plurality of PV cells, e.g. one or more serial strings of PV cells.

Power converter circuitry 114 may include, for example, one or more: buck converter circuitry, boost converter circuitry, buck/boost converter circuitry, buck+boost converter circuitry, flyback converter circuitry, etc. Power converter circuitry 114 may include DC to DC power converters and/or include AC to DC power converters. Power converter circuitry 114 may be configured to convert an input power to an output power.

Each power source 110A-C may include one or more terminals connected to the DC bus 102. The one or more terminals of the power source 110 may be switchably connected to the DC bus 102.

Energy storage device 104 and power source 110 may be configured to provide power to DC bus 102 regardless of whether the AC power source 130 (e.g., AC grid 130) is connected to the DC bus 102. For example, energy storage devices 104 and power sources 110 may be configured to provide power to DC bus 102 using stored power or generated power. As an example, energy storage device 104 may ramp up voltage on DC bus 102 and provide power to DC loads 116 before power sources 110 are connected to DC bus 102. For example, energy storage device 104A may ramp up voltage on DC bus 102 before power sources 110 are producing sufficient power (e.g., power greater than a power threshold). After power sources 110 are producing sufficient power (e.g., power greater than the power threshold) then power sources 110 may connect and supply power to a DC bus 102 that has already been "pre-charged" (e.g., raised or ramped-up greater than a zero voltage level).

In some examples, after the power source 110 connects to the DC bus 102, the energy storage device 104 may switch into a monitoring mode of operation or a charging mode of operation. In the monitoring mode of operation, the energy storage device 104 might not supply power to the DC bus 102, or charge the energy storage circuitry 106, but energy storage device 104 may just draw a relatively small amount of power to monitor the DC bus 102 to determine if power is to be supplied from the energy storage device 104 in a discharging mode of operation or supplied to the energy storage device 104 in the charging mode of operation. For example, energy storage device 104 may draw a minimal power sufficient to provide power to control circuitry or sensors, but may disconnect energy storage circuitry 106 from the DC bus 102. The determination for the energy storage device 104 to switch into the monitoring mode of operation or the charging mode of operation (or the discharging mode of operation) may be based on the state of charge of the energy storage device 104. The determination for the energy storage device 104 to operate in the monitoring mode of operation, the charging mode of operation, or the discharging mode of operation may be based on the measured voltage of the DC bus 102. The determination for the energy storage device 104 to operate in the monitoring mode of operation, the charging mode of operation, or the discharging mode of operation may be based on a total power produced and a total power consumed by the power system.

DC loads 116A-B may be configured to receive power from DC bus 102. DC loads 116A-B may include communication circuitry configured to communicate with other devices connected to DC bus 102. DC loads 116A-B may include DC load circuitry 118A-B (e.g., resistor(s) or other electrical circuit components which provide electrical resistance and use DC power). DC loads 116A-B may also include converter circuitry 120A-B (e.g., DC to DC converter circuitry). DC loads 116A-B may also include control circuitry configured to connect and disconnect DC load 116 to and from the DC bus 102, and/or control communication with other devices. DC loads 116A-B may include memory. The memory may store a configuration profile of the DC load 116. The configuration profile of the DC load 116 may include data related to: power usage of the DC load 116, time of usage of the DC load 116, weather conditions which affect the power usage of the DC load 116, etc. DC load 116 may be configured to respond to a query from an energy storage device 104. DC load 116 may be configured to send the configuration profile of the DC load 116 to the energy storage device 104 (e.g., using wired or wireless communications). DC loads 116 may be part of an electric vehicle (EV).

Power converter circuitry 120A-B may include, for example, one or more: buck converter circuitry, boost converter circuitry, buck/boost converter circuitry, buck+boost converter circuitry, flyback converter circuitry, etc. Power converter circuitry 120A-B may include DC to DC power converters. Power converter circuitry 120A-B may be configured to convert an input power to an output power. Each DC load 116A-B may include one or more terminals connected to the DC bus 102. The one or more terminals of the DC load 116 may be switchably connected to the DC bus 102.

Power converter 124 may be connected between DC bus 102 and AC bus 122. Power converter 124 may be configured to provide power to DC bus 102 from an AC grid 130. Power converter 124 may include converter circuitry (e.g., AC to DC converter circuitry) configured to convert AC power from the AC grid 130 to the DC bus 102. Power converter 124 may include communication circuitry configured to communicate with other devices connected to DC bus 102. Power converter 124 may include control circuitry configured to connect and disconnect power converter 124 to and from the DC bus 102, and/or control communication with other devices connected to the DC bus 102. For example, power converter 124 may ramp up voltage on DC bus 102 before power sources 110 are producing sufficient power (e.g., power greater than a power threshold). After power sources 110 are producing sufficient power (e.g., power greater than the power threshold) then power sources 110 may connect and supply power to a DC bus 102 that has already been pre-charged.

Power converter 126 may be connected between DC bus 102 and AC bus 122. Power converter 126 may be configured to provide power from DC bus 102 to AC grid 130. Power converter 126 may include converter circuitry (e.g., DC to AC converter circuitry) configured to convert DC power from the DC bus 102 to the AC grid 130. Power converter 126 may include communication circuitry configured to communicate with other devices connected to DC bus 102. Power converter 126 may include control circuitry configured to connect and disconnect power converter 126 to and from the DC bus 102, or control communication with other devices connected to the DC bus 102. For example, power converter 124 may connect to DC bus 102 after one or more power devices 104, 110 are connected to DC bus 102 and producing sufficient power (e.g., power greater than a power threshold). AC load 132 may be connected to and receive power from AC bus 122. Power converter 126 may include grid services circuitry configured to help power converter 126 connect to and provide power to AC grid 130.

Power system 100 may be focused on the DC bus 102. The AC grid 130 may be considered an element of the power system 100 and not the focus of the power system 100. For example, the AC grid 130 may be optional. DC bus 102 may interact with the AC grid 130 via power converter 124, and/or power converter 126. Power converter 124 may be an AC/DC power converter (e.g., a rectifier) that may supply power to the DC bus from the AC grid 130 (for example, the AC grid 130 may be considered like another DC power source). Power converter 124 may be a uni-directional power converter. Power converter 126 may be a DC/AC converter (inverter) that can receive power from the DC bus 102 and supply it to the AC grid 130 (for example, the AC grid 130, and other AC loads on separate AC buses, may be considered like another DC load). Power converter 126 may be a uni-directional power converter.

Power converter 124 may be sized, rated or configured to supply power to the DC bus 102 based on the average power that is supplied from additional non-DC bus sources (e.g., AC grid source 130). For example, the DC bus power sources 110 (e.g., a PV power source 110C, a wind source 110B which may be converted to DC and attached to DC bus, a generator 110A which may be converted to DC and attached to DC bus, or an energy storage device 104A or 104B) may supply about 80% of daily power, and only about 20% may be supplied from the AC grid 130. For example, a relatively small power converter 124 may supply the power to the DC bus 102 from the AC grid 130. For example, power converter 124 may only supply about 1 kw or about 2 kw (for example, as opposed to about 4 kw or about 8 kw that may be supplied by the DC power sources 110 and the energy storage device 106).

Power converter 126 may be sized, rated, or configured to supply power from the DC bus 102 to the AC grid 130 based on the average power that is generated by the DC power sources 110. For example, DC power sources 110 (e.g., a PV power source 110C, a wind source 110B, which may be converted to DC and attached to DC bus, a generator 110A which may be converted to DC and attached to DC bus, or an energy storage device 104A or 104B) may be able to provide a relatively great amount of power to the AC grid 130, e.g., about 4 kw to about 10 kw. For example, a relatively large power converter 126 may supply the power from the DC bus 102 to the AC grid 130. For example, power converter 126 may supply about 8 kw or about 10 kw (as opposed to about 1 kw or about 2 kw that get from the AC grid 130). For example, power converter 126 (which supplies power to AC grid 130) may be sized much greater than power converter 124 (which supplies power from AC grid 130). For example, power converter 126 may be rated for about 10 kw and power converter 124 may be rated for about 1 kw. Average power, peak power, peak capacity, etc. may be used to determine sizing or rating of the power converters 124 or 126 connected to AC bus 122 (and other power converters 136A-C connected to other AC buses 134, 140). The power converters may be sized according to loads of the power system 100.

In some examples, power converter 126 might have differing limitations from inverters that get power from the AC grid 130, since power converter 126 supplies power to but does not receive power from the AC grid 130. For example, when selecting power converter 126, there might not be a need to consider synchronization, islanding, grid tied, voltage source limitations (since power converter 126 may supply power to the AC grid 130 and not receive power from the AC grid 130), etc. In some examples, for example in certain geographic areas where there are strict rules or regulations for supplying power to the grid, power converter 126 may be omitted from the power system 100 (see, for example, power system 100D in FIG. 1D), and might not supply power from the DC bus 102 to the AC grid 130. In some examples, for example if DC sources are able to supply sufficient power or where AC connection is not possible, power converter 124 may be omitted from the power system 100 (see, for example, power system 100E in FIG. 1E), and might not receive power on the DC bus 102 from the AC grid 130.

In some examples, power converter 124 might be rated higher than power converter 126. In some examples, there may be a plurality of power converters 124 or power converters 126 (see, for example, power system 100B in FIG. 1b). The manager of the power system 100 may be energy storage devices 104 [(e.g., battery) that supply and receive power to and from the DC bus 102. For example, the energy storage devices 104 may be configured to manage the power system 100 using control circuitry included in one or more of the energy storage devices 104. Energy storage device 104 may be configured to balance the DC bus 102 and keep it at a relatively stable substantially constant voltage (e.g., about 400 volts DC, 800 volts DC, etc.). Energy storage device 104 may be configured to have a relatively quick ability to receive charge and discharge energy to be able to dynamically manage and keep the DC bus voltage substantially steady and substantially constant. Power system 100 may be designed based on energy storage device 104. Power system 100 may decide when to use generator 112A based on when noise is desired. Energy storage device 104 may also function as an uninterruptible power supply (UPS). For example, when one of the DC bus sources (or AC grid source) falls, then energy storage device 104 may supply additional power to the DC loads and keep the DC bus at a steady voltage (e.g., for a certain amount of time).

Energy storage device 104 may sum power taken from DC bus by DC bus loads and provided by DC bus sources and balance the power (e.g., to keep total power consumed by all loads together at about 20 kw, and total power produced by all sources together at about 20 kw). If additional power is to be supplied, it may be supplied to DC bus from energy storage device. If excess power is produced, it may be supplied to the energy storage device from the DC bus. Some loads may be DC loads and may get DC from the DC bus 102 without needing to convert AC (e.g. from AC grid 130) to DC first. Each load that needs AC may have a DC/AC converter (e.g., an inverter) that is designed specifically for that load's needs and might not have certain limitations that may be associated with getting power from the AC grid. DC bus 102 may be regulated and might not convert to DC (can use directly). DC bus voltage might not depend on PV voltage production, as the DC bus may be regulated (e.g., by energy storage device 104). Each converter may be independent.

Power converters 136A or 136B may be connected between DC bus 102 and AC bus 134. Power converters 136A or 136B may be configured to provide power from DC bus 102 to AC loads 138A-C. Power converters 136A or 136B may include converter circuitry (e.g., DC to AC converter circuitry) configured to convert DC power from the DC bus 102 to the AC grid 134. Power converters 136A or 136B may include communication circuitry configured to communicate with other devices connected to DC bus 102. Power converters 136A or 136B may include control circuitry configured to connect and disconnect the power converter to and from the DC bus 102, and/or control communication with other devices connected to the DC bus 102. Power converter 136C may be connected between DC bus 102 and AC bus 140. Power converter 136C may be configured to provide power from DC bus 102 to AC loads 142A-B. Power converters 136A-C may be relatively small power converters. Separate AC buses may be configured to ensure power is provided to certain AC loads depending on different situations. Each AC bus may include a plurality of AC bus lines (e.g., first phase, second phase, third phase, neutral, etc.).

Figure 1B:
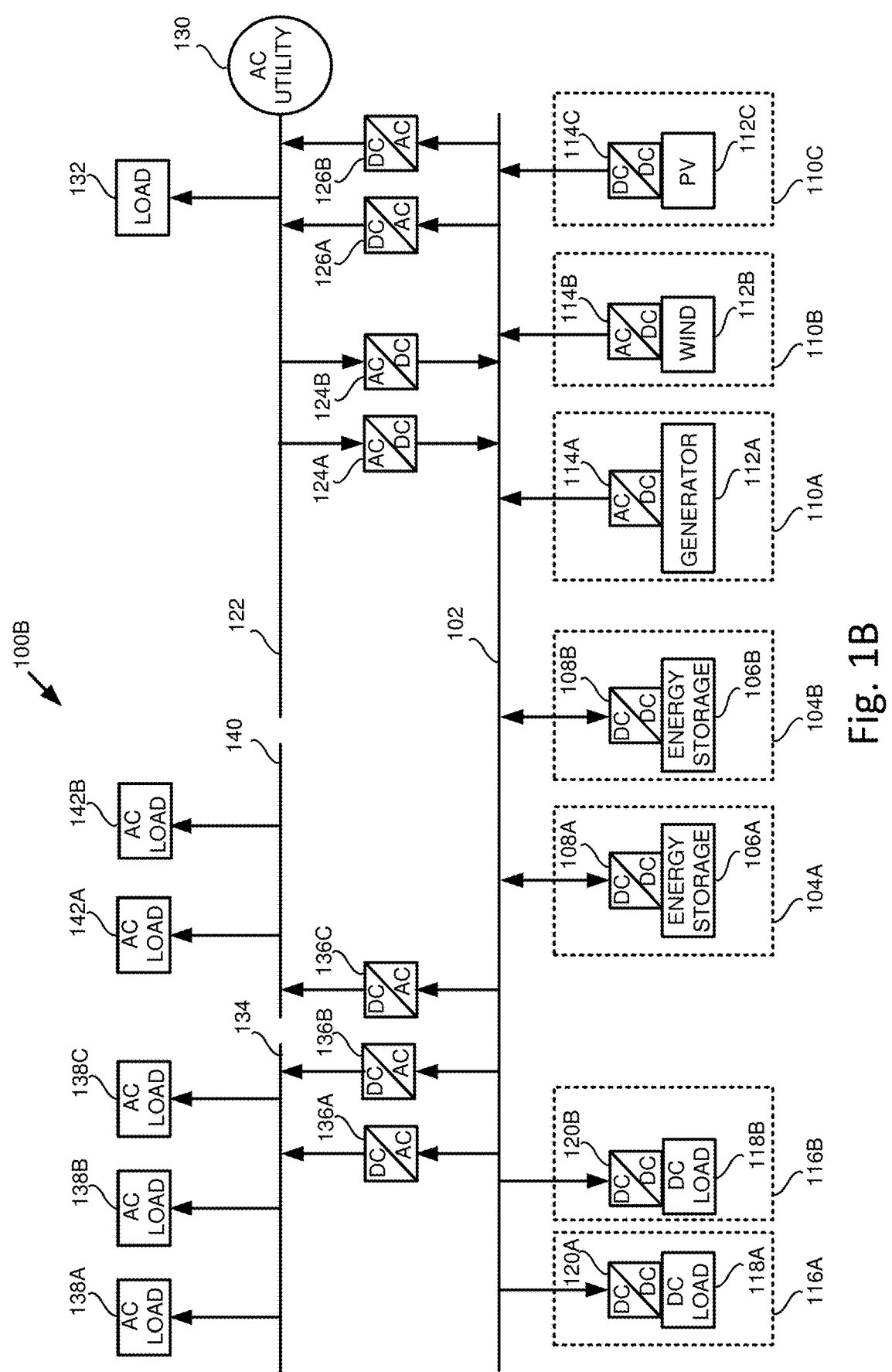
FIG. 1B shows an example power system.

Reference is now made to FIG. 1B, which shows an example power system 100B. Elements of power system 100B may be the same as, or similar to, elements of power system 100A of FIG. 1A, power system 200 of FIG. 2, power system 300 of FIG. 3, or of other power systems 100. Power system 100B may include: a DC bus 102, energy storage devices 104A-B, power sources 110A-C, and DC loads 116A-B. Power system 100 may also include: AC buses 122, 134, 140, power converters 136A-C, AC load 132, 138A-C, 142A-B, or AC power source 130.

In FIG. 1B there are shown a plurality of power converters 124 connected between the AC bus 122 and the DC bus 102, and a plurality of converters 126 connected between the DC bus 102 and the AC bus 122. Each of the different power converters 124, 126, or 136 may be connected between the DC bus and an AC bus. Each of the different power converters 124, 126, or 136 may have a different rating depending on whether the power converter supplies power or receives power. Each of the different power converters 124, 126, or 136 may have a different rating based on the requirements of the AC loads 132, 138, or 142 of the respective AC bus 122, 134, or 140.

Figure 1C:
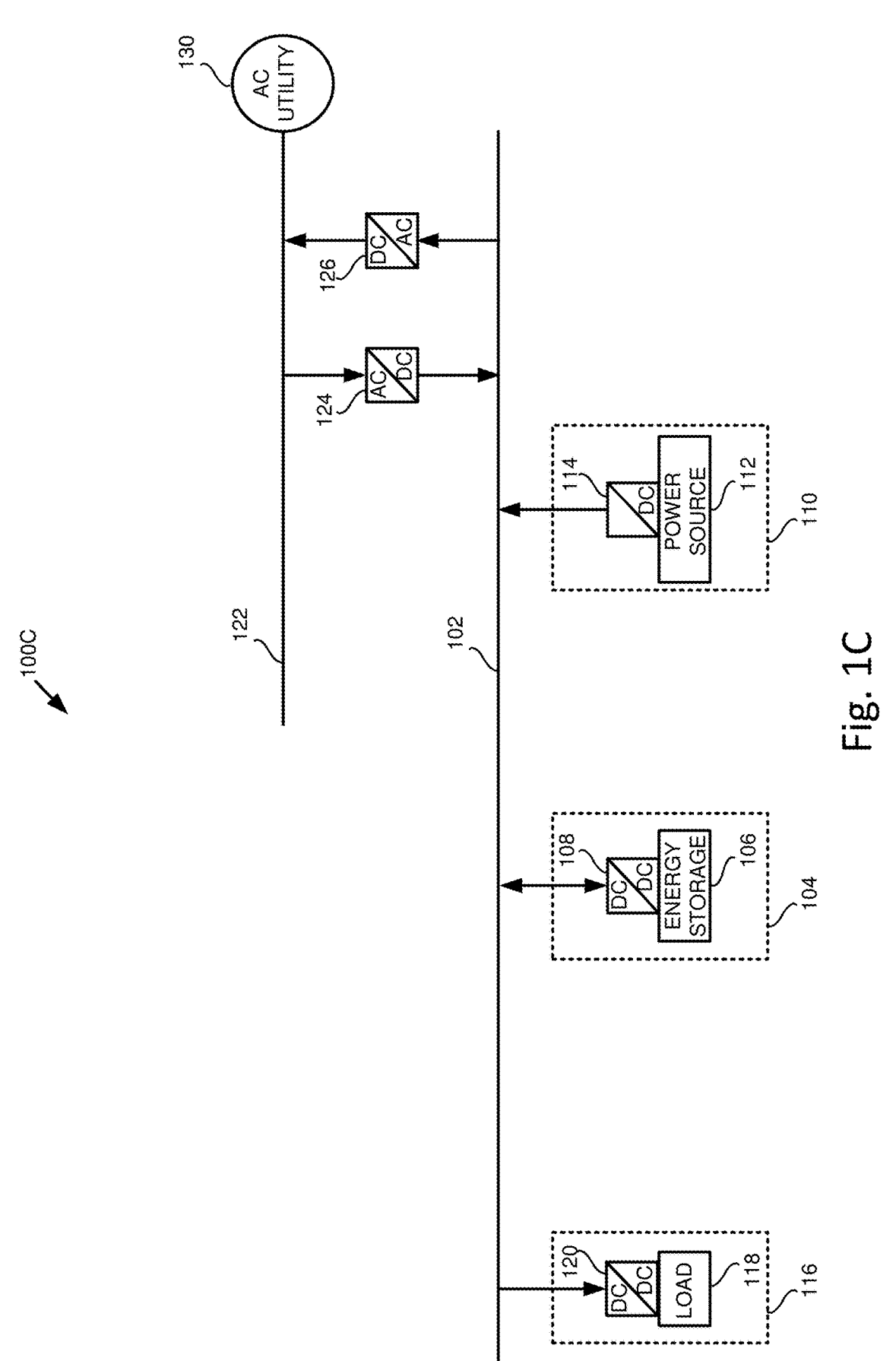
FIG. 1C shows an example power system.

Reference is now made to FIG. 1C, which shows an example power system 100C. Elements of power system 100C may be the same as, or similar to, elements of power system 100A of FIG. 1A, or of other power systems 100, 200, or 300. Power system 100C may include: a DC bus 102, energy storage devices 104, power sources 110, or DC loads 116. Power system 100C may also include: AC bus 122, power converters 124, 126, or AC power source 130. Power system 100C may include multiple power converters 124, 126 (for example, as shown in FIG. 1B). Power system 100C may include one or more energy storage devices 104, power sources 110, or DC loads 116 (only one of each is shown for the sake of simplicity).

In some instances, power system 100C might not include certain components, such as any of AC buses 134 and 140, power converters 136A-C, and AC load 132, 138A-C, and 142A-B. For example, power system 100C might not have other AC buses aside from AC bus 122, and might not provide backup to AC loads connected to other AC buses.

Figure 1D:
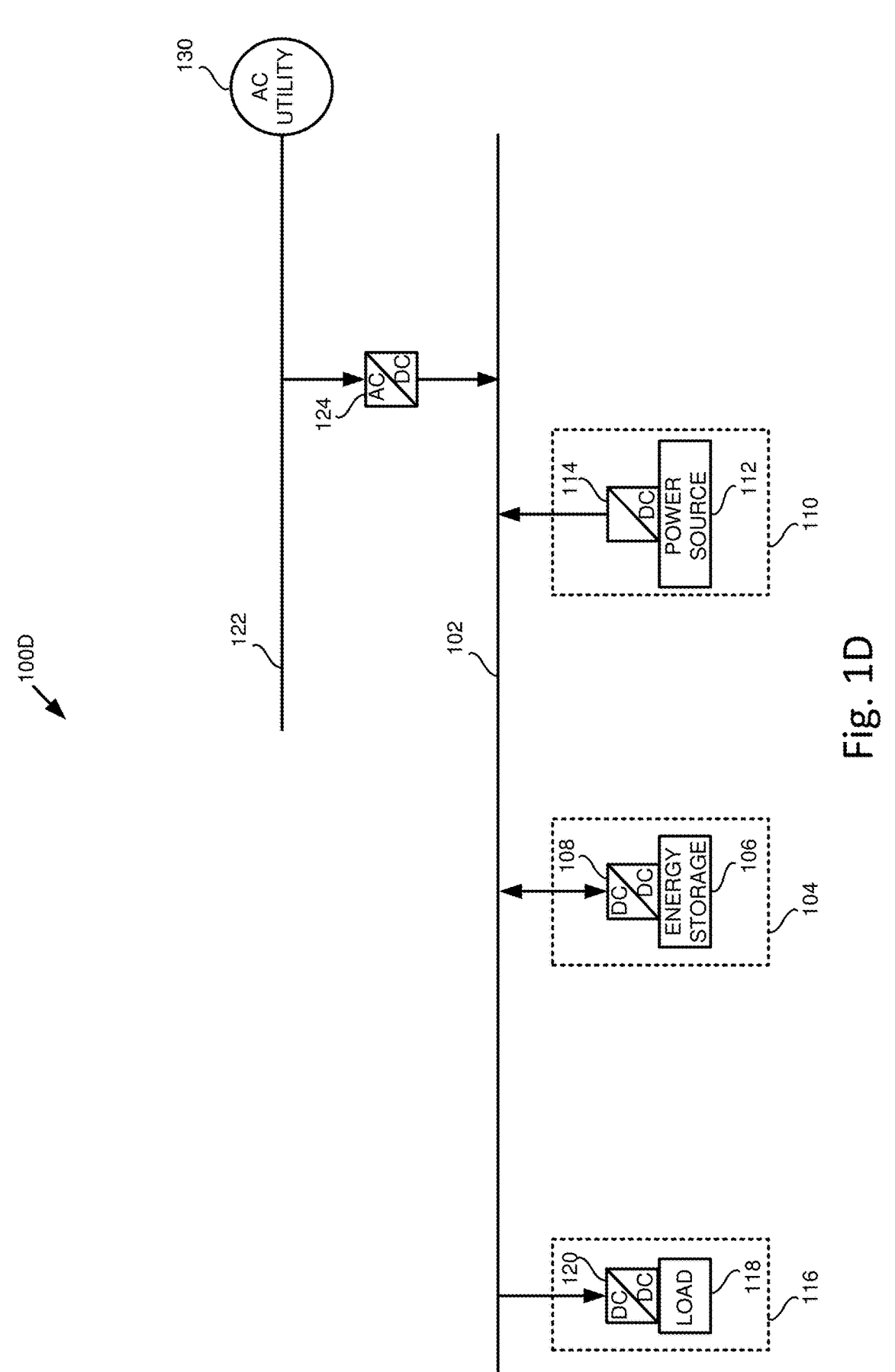
FIG. 1D shows an example power system.

Reference is now made to FIG. 1D, which shows an example power system 100D. Elements of power system 100C may be the same as, or similar to, elements of power system 100A of FIG. 1A, or of other power systems 100, 200, or 300. Power system 100D may include: a DC bus 102, energy storage devices 104, power sources 110, or DC loads 116. Power system 100D may also include: AC bus 122, power converter 124, or AC power source 130. Power system 100C may include multiple power converters 124 (for example, as shown in FIG. 1B). Power system 100C may include one or more energy storage devices 104, power sources 110, or DC loads 116 (only one of each is shown for the sake of simplicity).

In some instances, power system 100D might not include certain components, such as any of AC buses 134 and 140), power converters 126, 136A-C), and AC loads 132, 138A-C, or 142A-B. For example, power system 100D may include power sources 112 that don't produce a lot of excess power that may be supplied to AC grid 130, and might not provide power from the DC bus 102 to the AC grid 130. As another example, due to certain geographical limitations (e.g., weather or rules restrictions) power system 100D might not include an inverter that is rated and designed to provide power to the AC grid 130.

Figure 1E:
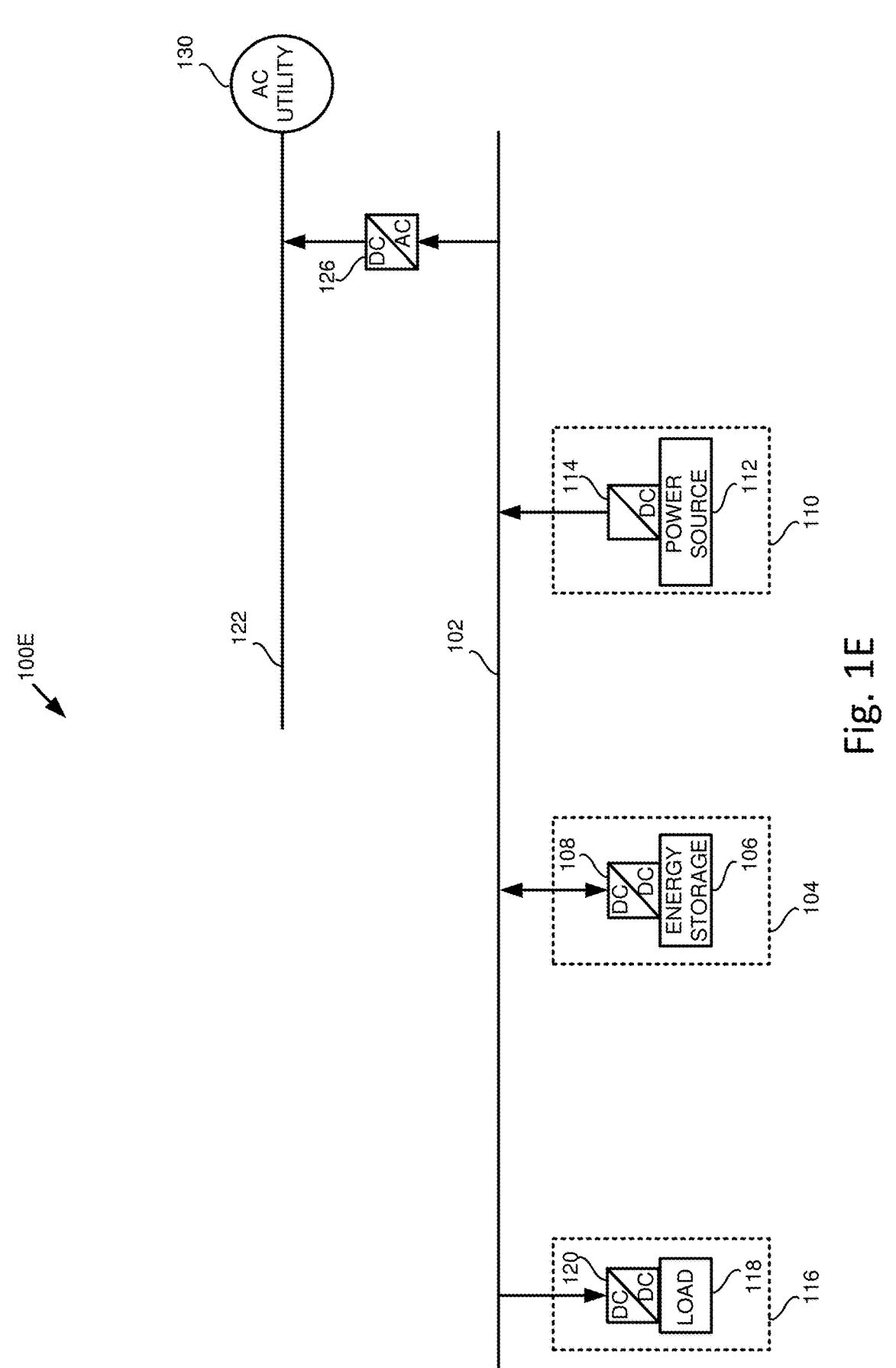
FIG. 1E shows an example power system.

Reference is now made to FIG. 1E, which shows an example power system 100E. Elements of power system 100E may be the same as, or similar to, elements of power system 100A of FIG. 1A, or of other power systems 100, 200, 300. Power system 100E may include: a DC bus 102, energy storage devices 104, power sources 110, or DC loads 116. Power system 100E may also include: AC bus 122, power converter 126, or AC power source 130. Power system 100C may include multiple power converters 126 (for example, as shown in FIG. 1B). Power system 100C may include one or more energy storage devices 104, power sources 110, or DC loads 116 (only one of each is shown for the sake of simplicity).

In some instances, power system 100E might not include certain components, such as any of AC buses 134 and 140, power converters 124 and 136A-C, and AC loads 132, 138A-C, and 142A-B. For example, power system 100E may include power sources 112 that produce a lot of excess power that may be supplied to AC grid 130, and might not supply power from the AC grid 130 to the DC bus 102. As another example, due to certain geographical limitations (e.g., weather, or rules restrictions) power system 100E might not include an inverter that is rated and designed to receive power from the AC grid 130.

Figure 1F:
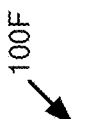
FIG. 1F shows an example power system.
Figure 1F:
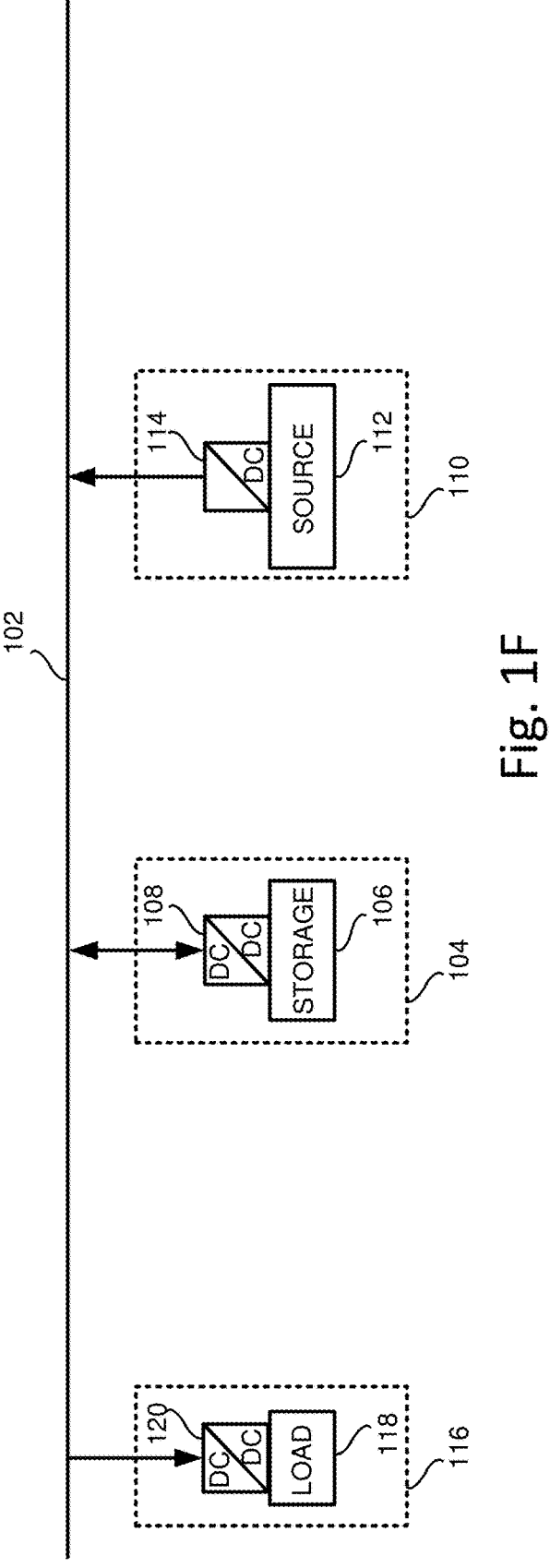

Reference is now made to FIG. 1F, which shows an example power system 100F. Elements of power system 100F may be the same as, or similar to, elements of power system 100A of FIG. 1A, or of other power systems 100, 200, 300. Power system 100F may include: a DC bus 102, energy storage devices 104, power sources 110, or DC loads 116. Power system 100C may include one or more energy storage devices 104, power sources 110, or DC loads 116 (only one of each is shown for the sake of simplicity).

In some instances, power system 100F might not include certain components, such as any of AC buses 122, 134, and 140, power converters 124, 126, and 136A-C, AC loads 132, 138A-C, and 142A-B, and AC power source 130. For example, power system 100F might not supply power to or from the AC grid 130. As another example, due to certain geographical limitations (e.g., weather, or rules restrictions)

power system 100F might not include an inverter that is rated and designed to provide power to or receive power from the AC grid 130.

Figure 2:
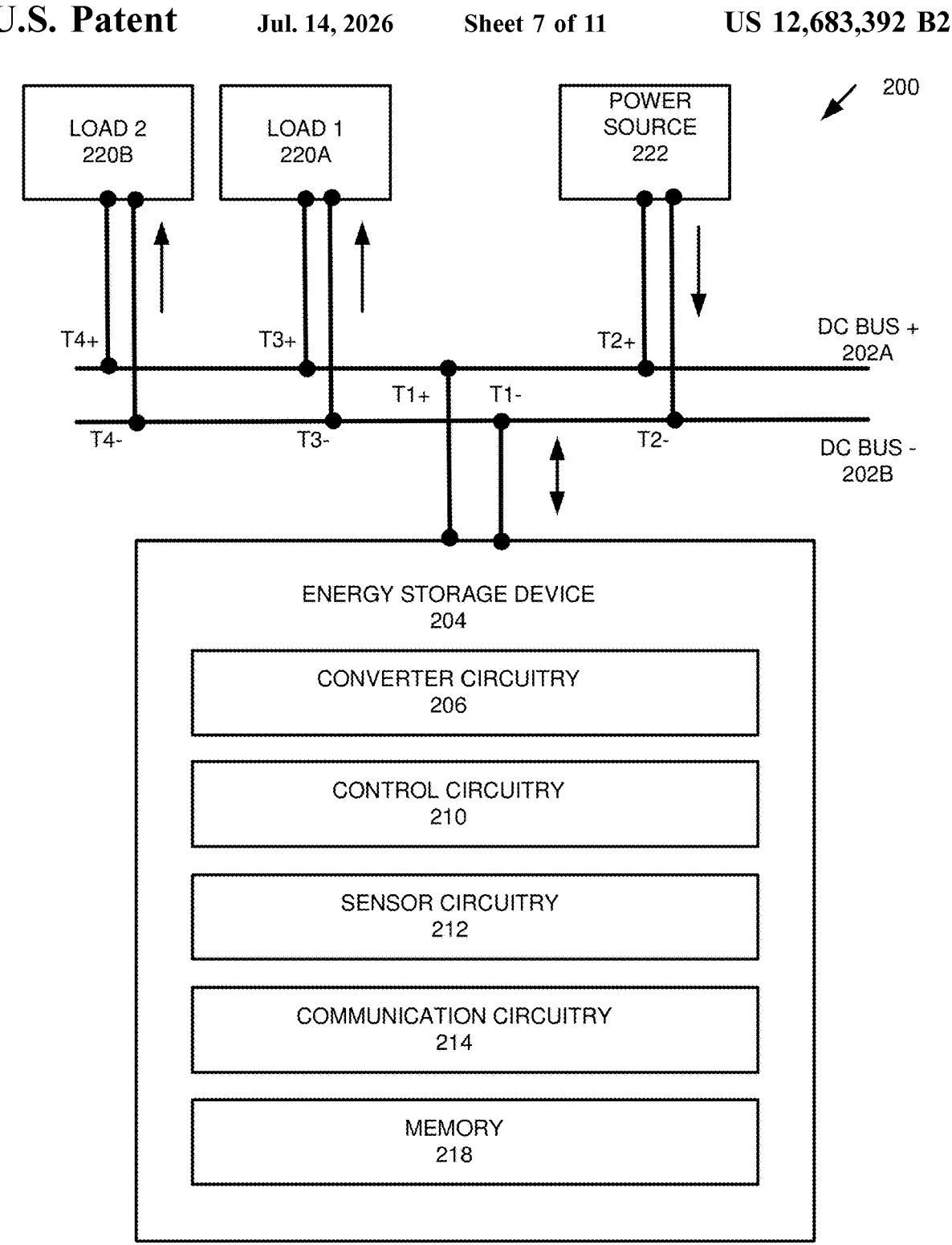
FIG. 2 shows an example power system.

Reference is now made to FIG. 2, which shows an example power system 200. Elements of power system 200 may be the same as, or similar to, elements of power system 100A of FIG. 1A, power system 300 of FIG. 3, or of other power systems 100. Power system 200 may include DC bus 202A-B, energy storage device 204, loads 220A-B, or power sources 222.

DC bus 202 may be similar to DC bus 102 described above. DC bus may include a positive DC bus line 202A and a negative DC bus line 202B. Different elements of power system 200 may be connected to the DC bus 202 via the positive DC bus line 202A or the negative DC bus line 202B. Elements of power system 200 may be connected to the positive DC bus line 202A via a positive terminal T+. Elements of power system 200 may be connected to the negative DC bus line 202B via a negative terminal T−. For example, energy storage device 204 may be connected to the positive DC bus line 202A via positive terminal T1+ and connected to the negative DC bus line 202B via negative terminal T1−. Power source 222 may be connected to the positive DC bus line 202A via positive terminal T2+ and connected to the negative DC bus line 202B via negative terminal T2−.

Loads 220 may be similar to DC loads 116 or AC loads which may include a power converter as described above. Energy storage devices 204 may be similar to energy storage devices 104 described above. For example, energy storage device 204 may be a bi-directional energy storage device, similar to bi-directional energy storage devices 104 described above. Energy storage device 204 may have a bi-directional connection to supply power to or receive power from DC bus 202 at terminals T1+, T1−.

Power source 222 may have a uni-directional connection to supply power to DC bus 202 at terminals T2+, T2−. Load 220A may have a uni-directional connection to receive power from DC bus 202 at terminals T3+, T3−, and load 220B may have a uni-directional connection to receive power from DC bus 202 at terminals T4+, T4−. Energy storage device 204 may include converter circuitry 206, control circuitry 210, sensor circuitry 212, communication circuitry 214, or memory 218.

Converter circuitry 206 may be similar to converter circuitry 108, 114 described above. For example, energy storage device 204 may be a bi-directional power device, like bi-directional power device 104, and converter circuitry 206 may be similar to converter circuitry 108 and configured to convert power in both directions (e.g., to and from the DC bus 202).

Converter circuitry 206 may include, for example, one or more: DC to DC converters (e.g., buck converters, boost converters, buck/boost converters, buck+boost converters, etc.), DC to AC converters (also referred to as inverters), combiner and/or monitoring boxes, etc. The inverters of power systems 100, 200 may be for one or more phases (e.g., one phase inverter, two phase inverter, three phase inverter, etc.), and may include lines or phases that are not shown herein for the sake of simplicity. Converter circuitry 206 may be configured to convert an input power to an output power.

Sensor circuitry 212 may be configured to obtain measurement data related to an electrical parameter of the DC bus. For example, the electrical parameter may be voltage, power, current, etc. Sensor circuitry 212 may provide the measurement data to control circuitry. Control circuitry may receive measurement data related to a first electrical parameter and measurement data related to a second electrical parameter and determine electrical parameter data related to a third electrical parameter. For example, control circuitry may receive measurement data related to voltage and measurement data related to current and determine electrical parameter data related to power.

Communication circuitry 214 may be configured to perform wired (e.g., power line communication (PLC)), or wireless (e.g., wi-fi) communications. Communication circuitry 214 may include transmitter circuitry and receiver circuitry. The transmitter circuitry may be configured to transmit communication signals, and the receiver circuitry may be configured to receive communication signals.

Memory 218 may be configured to store data. For example, memory 218 may be configured to store data related to one or more devices connected to the DC bus 202. For example, memory device may store a configuration profile or a power profile of power devices or loads connected to the DC bus 202. Energy storage device 204 may access and use the stored data to manage the voltage on the DC bus 202. For example, energy storage device 204 may increase a voltage threshold to a higher voltage level based on the stored data. Power device 204 may also decrease a voltage threshold to a lower voltage level based on the stored data. For example, the stored data may indicate a time of day or year or certain device, that dictates a higher voltage level or a lower voltage level.

Converter circuitry 206 may also be referred to as a power converter. Converter circuitry 206 may include direct current (DC) output terminals. One or more of the DC output terminals of converter circuitry 206 may be connected to DC bus 202 (e.g., at a terminal of DC bus 202, such as terminal T1). For example, one or more of the DC output terminals of converter circuitry 206 may be switchably connected to DC bus 202 via one or more switches.

Control circuitry 210 may also be referred to as a controller. Control circuitry 210 together with sensor 212 may be configured to measure a voltage of the DC output terminals of converter circuitry 206. Control circuitry 210 may be configured to balance the voltage of the DC bus by maintaining the DC bus voltage according to one or more voltage thresholds. Based on a determination that the measured voltage is greater than the voltage threshold, the control circuitry 210 may control the energy storage device to receive power from the DC bus and lower the DC bus voltage closer to the voltage threshold. Based on a determination that the measured voltage is less than the voltage threshold, the control circuitry 210 may control the energy storage device to provide power to the DC bus and raise the DC bus voltage closer to the voltage threshold.

Control circuitry 210 may be configured to obtain power values and determine a total power produced on the DC bus and a total power consumed on the DC bus. Control circuitry 210 may determine which of the total power produced and the total power consumed is greater, and to balance the power of the DC bus accordingly. For example, when the total power produced is greater, control circuitry 210 may control energy storage device 204 to receive power from the DC bus to balance power of the power system. when the total power consumed is greater, control circuitry 210 may control energy storage device 204 to provide power to the DC bus to balance power of the power system. Control circuitry 210 may balance the power of the DC bus while maintaining the voltage of the DC bus according to one or more voltage thresholds (e.g., according to a voltage threshold, within a range of voltage thresholds, etc.).

Control circuitry 210 may communicate with the additional devices using PLC communications or wireless communications. For example, control circuitry 210 may communicate with the additional devices using wireless communications before or after the additional devices are connected to the DC bus 202. The communications may be power line communications on the DC output terminals. The communications may be wireless communications. The power converter may include input terminals configured to connect to a DC power source. The power converter may include DC-DC converter circuitry. The power converter may include input terminals configured to connect to an AC power source, and wherein the power converter comprises AC-DC converter circuitry.

Memory may be configured to store data related to the additional devices. Control circuitry 210 may be configured to use the data related to the additional devices and set the power converter to output the second voltage. The data may be related to at least one of: state of charge, power usage, time usage, or weather usage. State of charge data may include data related to a level of charge of an energy storage device. The level of charge may be relative to the total capacity of the energy storage device. The level of charge may be a specific numeric indication of level of charge, e.g., 10%, 40%, 70%, etc. The level of charge may be a more general indication of level of charge, e.g., low, medium, high, etc. For example, the level of charge may be a range. For example, low charge may be between about 0% to about 20%, medium charge may be between about 20% to about 70%, high charge may be between about 70% and about 100%, etc. The state of charge data may be used to determine an expected power consumption (e.g., energy usage) or power usage of the additional device. Power usage data may include data related to typical power usage. The power usage data may be a specific numeric indication, e.g., about 80 W, about 500 W, about 1 kW, etc. The power usage may be a more general indication of power usage, e.g., low, medium, high, etc. For example, low power usage, medium power usage, high power usage. For example, the power usage may be a range. For example, low power usage may be between about 0.5 W to about 200 W, medium power usage may be between about 200 W to about 1 kW, high power usage may be between about 1 kW and about 3 KW, etc.

The power usage data may be used to determine an expected power consumption (e.g., energy usage) of the additional device. Time data may be related to time of typical usage of an additional device. For example, the time data may include minutes, hours, days, time of day, month, year, etc. For example, the time data may be a specific numeric indication, e.g., about 10 minutes, about 60 minutes, about 3 hours, about 8 am, about July, etc. The power usage may be a more general indication of power usage, e.g., short, medium, long etc. For example, the time may be a range (e.g., of minutes, hours, days, weeks, months, years, etc.). The time may be morning, afternoon, evening, weekday, weekend, season (e.g., summer, winter, etc.) The time data may be used to determine an expected power consumption (e.g., energy usage) of the additional device. Energy usage data may be determined using power data and time data to determine typical expected power consumption data of an additional device. Weather data may be related to weather of typical usage of an additional device. For example, the weather data may include specific numeric indication, e.g., about a certain temperature, humidity, wind speed, irradiance from the sun, etc. The weather may be a more general indication, e.g., warm weather, cold weather, rain, snow, cloudy, sunny, etc. The weather data may be used to determine an expected power consumption (e.g., energy usage) or power usage of the additional device.

Figure 3:
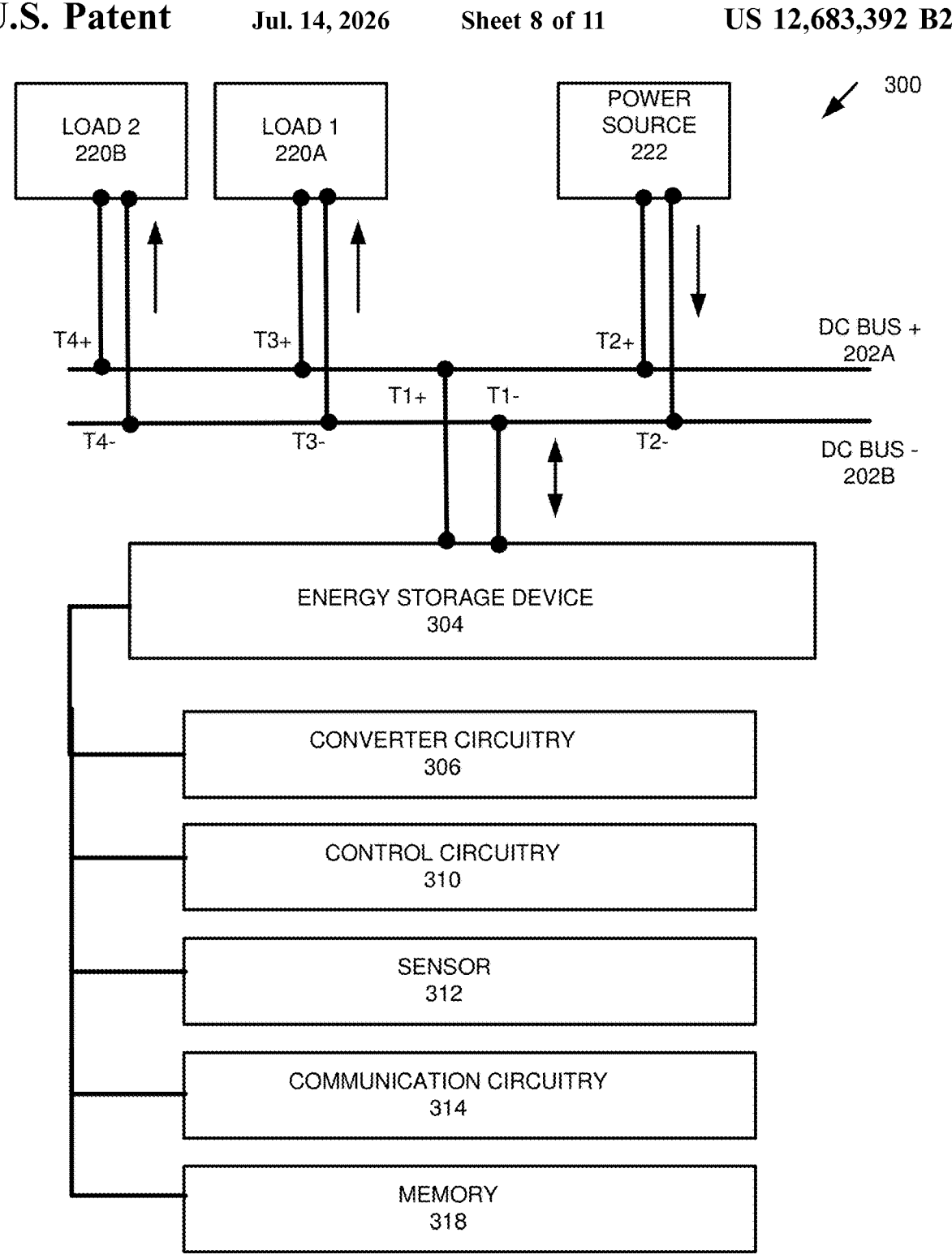
FIG. 3 shows an example power system.

Reference is now made to FIG. 3, which shows an example power system 300. Elements of power system 300 may be the same as, or similar to, elements of power system 200 of FIG. 2, or of other power systems 100.

Power system 300 may include DC bus 202A-B, energy storage device 304, loads 220A-B, or power sources 222. Power system 300 may also include converter circuitry 306, control circuitry 310, sensor circuitry 312, communication circuitry 314, or memory 318. One or more of the elements of power system 300 may have their own housing, or may be housed together with other elements of the power system 300 in a common housing. For example, control circuitry 310 may be housed in the same housing as converter circuitry 310, a system power device (e.g., inverter or rectifier), senor 312, power source 222, etc. Each of the elements of power system 300 may be connected to at least one other element of the power system 300 electrically and/or communicatively.

Figure 4:
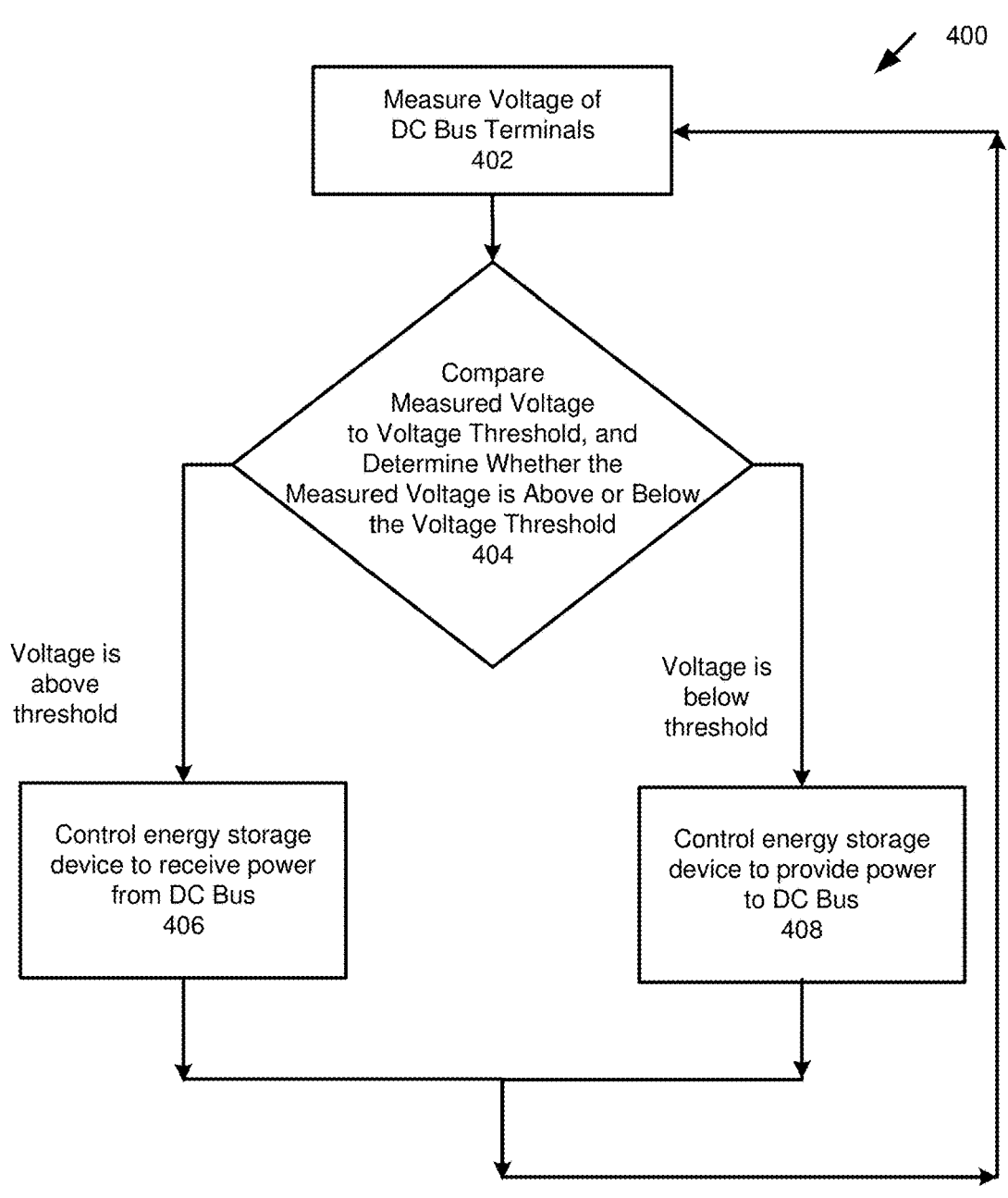
FIG. 4 shows an example method for managing a DC bus.

Reference is now made to FIG. 4, which shows an example method 400 for managing a DC bus 102 or 202. Method 400 may be performed by control circuitry 210 or 310.

In step 402, control circuitry 210 or 310 together with sensor circuitry 212 or 312 may measure a voltage related to DC output terminals (e.g., across DC output terminals, between a DC output terminal and a ground terminal or a neutral terminal, etc.).

In step 404, control circuitry 210 or 310 may compare the measured voltage to a voltage threshold and may determine whether the measured voltage is above or below the voltage threshold.

Based on a control circuitry 210 or 310 determining that the measured voltage is above the voltage threshold (e.g., for a predetermined amount of time), control circuitry 210 or 310 may proceed to step 406. In step 406, control circuitry 210 or 310 may control the energy storage device 104, 204, or 304 to receive power from the DC bus 102 or 202 (also referred to as a charging mode of operation). For example, energy storage device 104, 204, or 304 may balance the DC bus voltage and maintain the DC bus voltage close to a voltage threshold. Control circuitry 210 or 310 may return to step 402.

Based on control circuitry 210 or 310 determining that the measured voltage is below the voltage threshold (e.g., for a predetermined amount of time), control circuitry 210 or 310 may proceed to step 408. In step 408, control circuitry 210 or 310 may control the energy storage device 104, 204, or 304 to provide power to the DC bus 102 or 202 (also referred to as a discharging mode of operation). For example, energy storage device 104, 204, or 304 may balance the DC bus voltage and maintain the DC bus voltage close to a voltage threshold. Control circuitry 210 or 310 may return to step 402.

For example, the voltage threshold may be about 400 V. In step 402, the measured voltage may be 380 V. In step 404, the determination may be that the measured voltage is below the voltage threshold. In step 408, the energy storage device 104, 204, or 304 may provide the DC bus 102 or 202 with power to raise the DC bus voltage closer to the voltage threshold. As another example, in step 402, the measured voltage may be 410 V. In step 404, the determination may be that the measured voltage is above the voltage threshold. In step 406, the energy storage device 104, 204, or 304 may receive power from the DC bus 102 or 202 to lower the DC bus voltage closer to the voltage threshold. In some examples, the voltage threshold may be controlled. For example, the voltage threshold may be about 200 V, about 300 V, about 400 V, about 800 V, about 850 V, etc. In some examples, the voltage threshold may be a range of voltages. For example, the voltage threshold may be about 200 V to about 300 V, about 300 V to about 400 V, about 390 V to about 410 V, about 400 V to about 800 V, etc.

Figure 5:
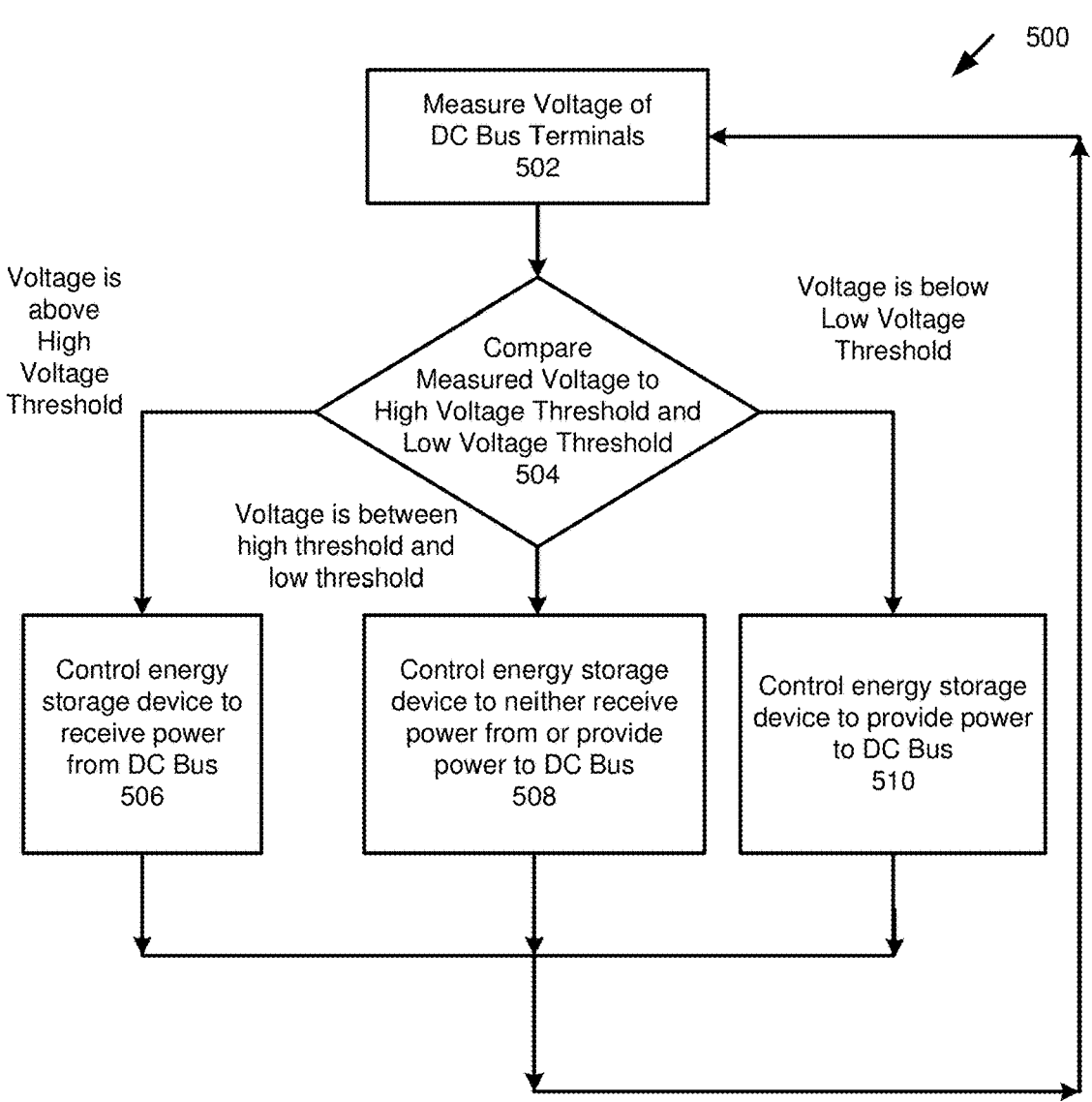
FIG. 5 shows an example method for managing a DC bus.

Reference is now made to FIG. 5, which shows an example method 500 for managing a DC bus 102 or 202. Method 500 may be performed by control circuitry 210 or 310.

In step 502, control circuitry 210 or 310 together with sensor circuitry 212, 312 may measure a voltage related to DC output terminals (e.g., across DC output terminals, between a DC output terminal and a ground terminal or a neutral terminal, etc.).

In step 504, control circuitry 210 or 310 may compare the measured voltage to a high voltage threshold and a low voltage threshold (to keep the DC bus voltage within a voltage range) and may determine whether the measured voltage is above the high voltage threshold, between the high voltage threshold and the low voltage threshold, or below the low voltage threshold.

Based on control circuitry 210 or 310 determining that the measured voltage is above the high voltage threshold (e.g., for a predetermined amount of time), control circuitry 210 or 310 may proceed to step 506. In step 506, control circuitry 210 or 310 may control the energy storage device 104, 204, or 304 to receive power from the DC bus 102 or 202 (also referred to as a charging mode of operation). For example, energy storage device 104, 204, or 304 may balance the DC bus voltage and maintain the DC bus voltage between the voltage thresholds. Control circuitry 210 or 310 may return to step 502.

Based on control circuitry 210 or 310 determining that the measured voltage is between the high voltage threshold and the low voltage threshold (e.g., for a predetermined amount of time), control circuitry 210 or 310 may proceed to step 508. In step 508, control circuitry 210 or 310 may control the energy storage device 104, 204, or 304 to neither receive power from or provide power to the DC bus 102 or 202 (also referred to as a monitoring mode of operation). For example, energy storage device 104, 204, or 304 may balance the DC bus voltage and maintain the DC bus voltage between the voltage thresholds. Control circuitry 210 or 310 may return to step 502.

Based on control circuitry 210 or 310 determining that the measured voltage is below the low voltage threshold (e.g., for a predetermined amount of time), control circuitry 210 or 310 may proceed to step 510. In step 510, control circuitry 210 or 310 may control the energy storage device 104, 204, or 304 to provide power to the DC bus 102 or 202. (also referred to as a discharging mode of operation). For example, energy storage device 104, 204, or 304 may balance the DC bus voltage and maintain the DC bus voltage between the voltage thresholds. Control circuitry 210 or 310 may return to step 502. monitoring mode of operation For example, the high voltage threshold may be about 410 V and the low voltage threshold may be about 390 V. In step 502, the measured voltage may be 375 V. In step 504, the determination may be that the measured voltage is below the low voltage threshold. In step 510, the energy storage device 104, 204, or 304 may provide the DC bus 102 or 202 with power to raise the DC bus voltage closer to the low voltage threshold. As another example, in step 502, the measured voltage may be 415 V. In step 504, the determination may be that the measured voltage is above the high voltage threshold. In step 506, the energy storage device 104, 204, or 304 may receive power from the DC bus 102 or 202 to lower the DC bus voltage closer to the high voltage threshold. As another example, in step 502, the measured voltage may be 400 V. In step 504, the determination may be that the measured voltage is between the high voltage threshold and the low voltage threshold. In step 508, the energy storage device 104, 204, or 304 may neither receive power from or provide power to the DC bus 102 or 202 to maintain the DC bus voltage between the high voltage threshold and the low voltage threshold. In some examples, the high voltage threshold and the low voltage threshold may be controlled. For example, the high voltage threshold and/or the low voltage threshold may be controlled based on time of day, time of year, weather, etc. For example, at night or more thresholds may be different than during the day, during winter thresholds may be different than during the summer, when it is windy thresholds may be different than when it is not windy, when it is cloudy thresholds may be different than when it is clear, etc.

Figure 6:
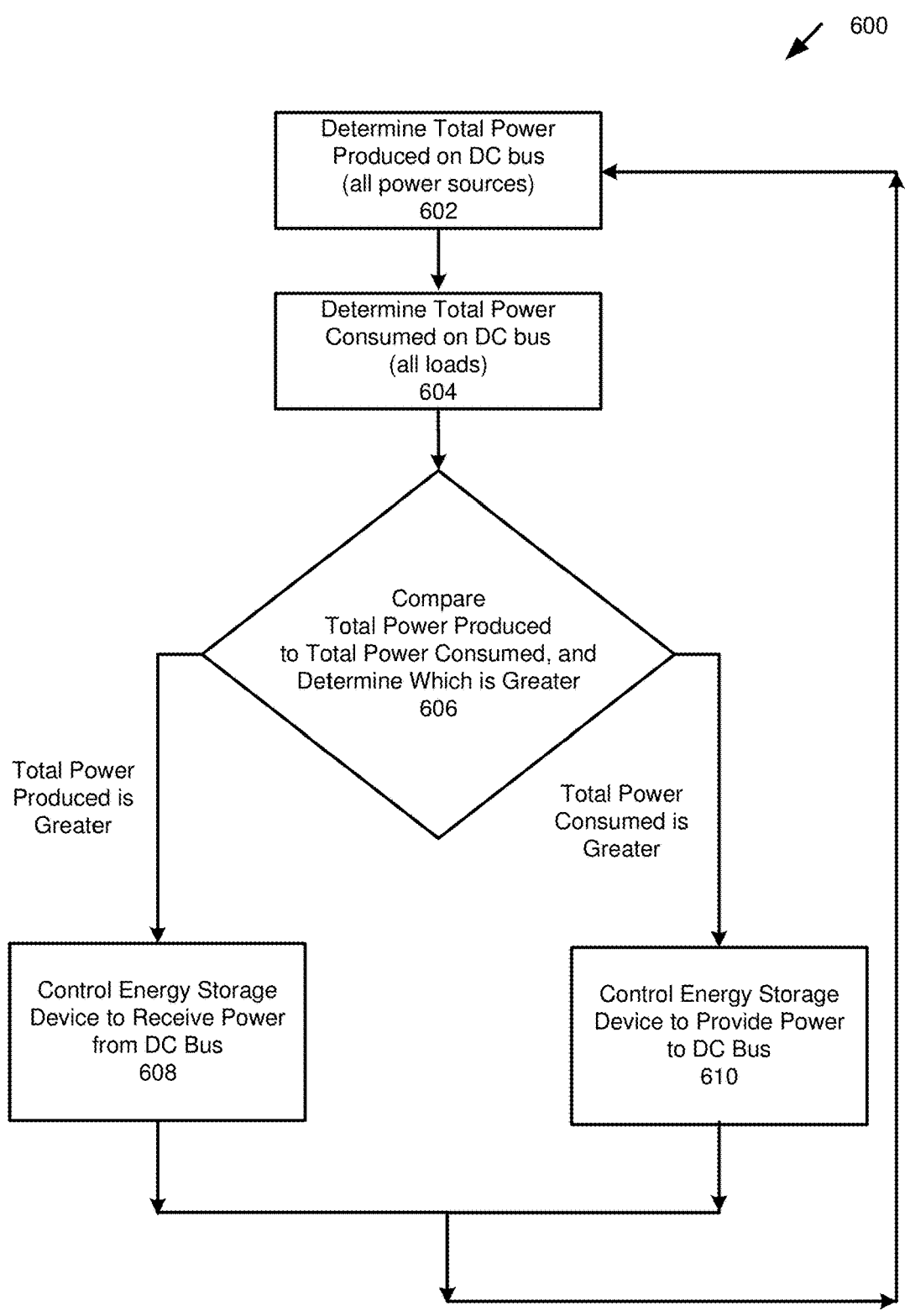
FIG. 6 shows an example method for managing a DC bus.

Reference is now made to FIG. 6, which shows an example method 600 for managing a DC bus 102 or 202. Method 600 may be performed by control circuitry 210 or 310.

In step 602, control circuitry 210 or 310 may determine a total power produced related to the DC bus 102 or 202. The total power produced may be a sum of the power produced by the power sources connected to the DC bus 102 or 202. One or more sensors may be used to help determine the power produced by the power sources (e.g., each power source separately). The determination may be made based on historical data and/or device profiles related to the power system that may be stored in memory accessible by control circuitry 210 or 310.

In step 604, control circuitry 210 or 310 may determine a total power consumed related to the DC bus 102 or 202. The total power consumed may be a sum of the power consumed by the loads connected to the DC bus 102 or 202. One or more sensors may be used to help determine the power consumed by the loads (e.g., each load separately). The determination may be made based on historical data and/or device profiles related to the power system that may be stored in memory accessible by control circuitry 210 or 310.

In step 606, control circuitry 210 or 310 may compare the total power produced to the total power consumed and determines whether the total power produced is greater, or the total power consumed is greater.

Based on control circuitry 210 or 310 determining that the total power produced is greater than the voltage threshold (e.g., for a predetermined amount of time), control circuitry 210 or 310 may proceed to step 608. In step 608, control circuitry 210 or 310 may control the energy storage device 104, 204, or 304 to receive power from the DC bus 102 or 202 (also referred to as a charging mode of operation). For example, energy storage device 104, 204, or 304 may balance the DC bus power. Control circuitry 210 or 310 may return to step 602.

Based on control circuitry 210 or 310 determining that the measured voltage is below the low voltage threshold (e.g., for a predetermined amount of time), control circuitry 210 or 310 may proceed to step 510. In step 510, control circuitry 210 or 310 may control the energy storage device 104, 204, or 304 to provide power to the DC bus 102 or 202 (also referred to as a discharging mode of operation). For example, energy storage device 104, 204, or 304 may balance the DC bus power. Control circuitry 210 or 310 may return to step 502.

For example, in step 602, the determination may be that the total power produced is about 9 kw. In step 604, the determination may be that the total power consumed is about 10 kw. In step 606, the determination may be that the total power consumed is greater than the total power produced. In step 610, the energy storage device 104, 204, or 304 may provide the DC bus 102 or 202 with power to raise the total power produced closer to the total power consumed. As another example, the determination may be that the total power produced is about 9 kw. In step 604, the determination may be that the total power consumed is about 10 kw. In step 606, the determination may be that the total power consumed is greater than the total power produced. In step 610, the energy storage device 104, 204, or 304 may provide the DC bus 102 or 202 with power to raise the total power produced closer to the total power consumed. In some examples, the total power produced and the total power consumed may be controlled. For example, the power may be controlled based on time of day, time of year, weather, etc. For example, the power may be controlled based on peak usage or average usage. For example, the usage may be based on a certain time of day, year, weather, location, etc.

In some examples, based on control circuitry 210 or 310 determining that the total power produced is about equal to the total power consumed (e.g., for a predetermined amount of time), control circuitry 210 or 310 may control the energy storage device 104, 204, or 304 to neither receive power from or provide power to the DC bus 102 or 202 (also referred to as a monitoring mode of operation). For example, energy storage device 104, 204, or 304 may balance the DC bus power.

In some examples, based on a determination that control circuitry 210 or 310 determines that the difference between the total power produced and the total power consumed is within a range of power thresholds (e.g., for a predetermined amount of time), control circuitry 210 or 310 may control the energy storage device 104, 204, or 304 to neither receive power from or provide power to the DC bus 102 or 202 (also referred to as a monitoring mode of operation). For example, energy storage device 104, 204, or 304 may balance the DC bus power and maintain the DC bus power between power thresholds.

Control circuitry 210 or 310 may perform method 400 or method 500 simultaneously with method 600. Control circuitry 210 or 310 may perform method 400 or method 500 to control energy storage device 104, 204, or 304 to balance the DC bus voltage simultaneously with method 600 to balance the system power of the DC bus.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A system comprising:
    a direct current (DC) bus;
    an energy storage device connected to the DC bus; and
    control circuitry configured to:
        obtain a measurement of a voltage of the DC bus;
        determine a difference between the measured voltage of
            the DC bus and a voltage threshold;

control the energy storage device to provide power to the DC bus based on the measured voltage of the DC bus being below the voltage threshold;

control the energy storage device to receive power from the DC bus based on the measured voltage of the DC bus being above the voltage threshold; and control the energy storage device to receive voltage from the DC bus equal to the difference.

2. The system of claim 1, wherein the control circuitry is configured to maintain the voltage of the DC bus at a substantially constant voltage.

3. The system of claim 1, further comprising a plurality of converters connected to the DC bus.

4. The system of claim 1, further comprising:

a DC to AC converter connected to the DC bus; and an AC to DC converter connected to the DC bus.

5. The system of claim 4, wherein the DC to AC converter has a first power rating, and wherein the AC to DC converter has a second power rating.

6. The system of claim 5, wherein the first power rating is greater than the second power rating.

7. The system of claim 5, wherein the second power rating is greater than the first power rating.

8. The system of claim 1, further comprising a sensor, wherein the sensor is configured to:

measure the voltage of the DC bus; and provide the measured voltage of the DC bus to the control circuitry.

9. The system of claim 1, wherein the control circuitry is further configured to:

determine that the measured voltage of the DC bus is within a range; and maintain the voltage on the DC bus within the range.

10. The system of claim 1, wherein the energy storage device is connected across a pair of terminals of the DC bus.

11. The system of claim 10, wherein the measurement of voltage of the DC bus is across the pair of terminals.

12. The system of claim 10, wherein the pair of terminals includes a positive terminal and a negative terminal.

13. The system of claim 1, wherein the control circuitry is further configured to:

control the energy storage device to provide voltage to the DC bus based on the difference.

14. The system of claim 1, wherein the control circuitry is configured to balance the voltage on the DC bus.

15. The system of claim 1, wherein the control circuitry is configured to balance the power on the DC bus.

16. The system of claim 1, further comprising:

a plurality of DC to AC converters connected to the DC bus; and a plurality of AC to DC converters connected to the DC bus.

17. The system of claim 16, wherein each DC to AC converter of the plurality of DC to AC converters has a first power rating, and wherein each AC to DC converter of the plurality of AC to DC converters has a second power rating.

18. A method comprising:

connecting an energy storage device to a direct current (DC) bus;

measuring a voltage of the DC bus;

determining a difference between the measured voltage of the DC bus and a voltage threshold;

controlling the energy storage device to provide voltage to the DC bus based on the measured voltage of the DC bus being below the voltage threshold;

controlling the energy storage device to receive voltage from the DC bus based on the measured voltage of the DC bus being above the voltage threshold; and controlling the energy storage device to receive voltage from the DC bus equal to the difference.

19. An apparatus comprising:

a sensor configured to measure a voltage of a DC bus;

an energy storage device configured to be connected to the DC bus; and control circuitry configured to:

obtain the measured voltage of the DC bus from the sensor;

determine a difference between the measured voltage of the DC bus and a voltage threshold;

control the energy storage device to provide voltage to the DC bus based on the measured voltage of the DC bus being below the voltage threshold; and control the energy storage device to receive voltage from the DC bus based on the measured voltage of the DC bus being above the voltage threshold; and control the energy storage device to receive voltage from the DC bus equal to the difference.

20. The apparatus of claim 19, wherein the control circuitry is configured to maintain the voltage of the DC bus at a substantially constant voltage.

* * * * *